(12) United States Patent
Agrawal

(10) Patent No.: US 8,509,313 B2
(45) Date of Patent: Aug. 13, 2013

(54) VIDEO ERROR CONCEALMENT

(75) Inventor: Manisha Agrawal, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1040 days.

(21) Appl. No.: 11/860,244

(22) Filed: Sep. 24, 2007

(65) Prior Publication Data

US 2008/0084934 A1 Apr. 10, 2008

Related U.S. Application Data

(60) Provisional application No. 60/868,462, filed on Dec. 4, 2006, provisional application No. 60/828,865, filed on Oct. 10, 2006.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 7/64* | (2006.01) |
| *H04N 7/68* | (2006.01) |

(52) U.S. Cl.
CPC ... *H04N 7/64* (2013.01); *H04N 7/68* (2013.01)
USPC ............ 375/240.27; 375/240.12; 375/240.13; 375/240.15; 375/240.16; 382/252; 382/275; 348/700

(58) Field of Classification Search
None
See application file for complete search history.

(56) References Cited

U.S. PATENT DOCUMENTS

| | | | | |
|---|---|---|---|---|
| 5,473,379 | A * | 12/1995 | Horne | 375/240.16 |
| 5,510,834 | A * | 4/1996 | Weiss et al. | 348/97 |
| 5,774,593 | A * | 6/1998 | Zick et al. | 382/236 |
| 6,636,565 | B1 * | 10/2003 | Kim | 375/240.27 |
| 6,990,151 | B2 * | 1/2006 | Kim et al. | 375/240.27 |
| 7,006,568 | B1 * | 2/2006 | Gu et al. | 375/240.11 |
| 7,734,821 | B2 * | 6/2010 | Wang et al. | 709/246 |
| 2001/0014124 | A1 * | 8/2001 | Nishikawa | 375/240.16 |
| 2002/0181594 | A1 * | 12/2002 | Katsavounidis et al. | 375/240.24 |
| 2003/0012280 | A1 * | 1/2003 | Chan | 375/240.16 |
| 2004/0028134 | A1 * | 2/2004 | Subramaniyan et al. | 375/240.16 |
| 2004/0101042 | A1 * | 5/2004 | Chen | 375/240.01 |
| 2004/0139462 | A1 * | 7/2004 | Hannuksela et al. | 725/32 |
| 2004/0252230 | A1 * | 12/2004 | Winder | 348/402.1 |
| 2005/0141622 | A1 * | 6/2005 | Seo | 375/240.27 |
| 2005/0157800 | A1 * | 7/2005 | Kim | 375/240.27 |
| 2005/0190843 | A1 * | 9/2005 | Lee | 375/240.16 |
| 2006/0051068 | A1 * | 3/2006 | Gomila | 386/114 |
| 2006/0056513 | A1 * | 3/2006 | Shen et al. | 375/240.16 |
| 2006/0062304 | A1 * | 3/2006 | Hsia | 375/240.16 |
| 2006/0104366 | A1 * | 5/2006 | Huang et al. | 375/240.27 |
| 2006/0215761 | A1 * | 9/2006 | Shi et al. | 375/240.16 |
| 2006/0262864 | A1 * | 11/2006 | Shi et al. | 375/240.27 |
| 2007/0064812 | A1 * | 3/2007 | Baik | 375/240.27 |
| 2008/0004073 | A1 * | 1/2008 | John et al. | 455/556.1 |
| 2008/0186404 | A1 * | 8/2008 | Bull et al. | 348/616 |
| 2009/0060056 | A1 * | 3/2009 | Zhang | 375/240.27 |
| 2009/0262837 | A1 * | 10/2009 | Tokumo et al. | 375/240.27 |

* cited by examiner

*Primary Examiner* — Ayaz Sheikh
*Assistant Examiner* — Peter Chau
(74) *Attorney, Agent, or Firm* — Mima Abyad; W. James Brady; Frederick J. Telecky, Jr.

(57) ABSTRACT

Error concealment for video with a scene change detection based on inter-coded macroblock energy, spatial concealment for scene changes, and temporal concealment with predicted motion vectors as the global motion vector of the prior frame when half of the current frame macroblocks are corrupted.

4 Claims, 12 Drawing Sheets

VIDEO ERROR CONCEALMENT

CROSS-REFERENCE TO RELATED APPLICATIONS

This application claims priority from provisional application No. 60/828,865, filed Oct. 10, 2006 and 60/868,462, filed Dec. 4, 2006.

BACKGROUND

The present invention relates to digital video signal processing, and more particularly to devices and methods for video decoding error concealment.

There are multiple applications for digital video communication and storage, and multiple international standards for video coding have been and are continuing to be developed. Low bit rate communications, such as, video telephony and conferencing, led to the H.261 standard with bit rates as multiples of 64 kbps, and the MPEG-1 standard provides picture quality comparable to that of VHS videotape. Subsequently, H.263, MPEG-2, and MPEG-4 standards have been promulgated.

H.264/AVC is a recent video coding standard that makes use of several advanced video coding tools to provide better compression performance than existing video coding standards. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block of both temporal and spatial prediction errors. FIGS. 2A-2B illustrate H.264/AVC functions which include a deblocking filter within the motion compensation loop to limit artifacts created at block edges.

Traditional block motion compensation schemes basically assume that between successive pictures an object in a scene undergoes a displacement in the x- and y-directions and these displacements define the components of a motion vector. Thus an object in one picture can be predicted from the object in a prior picture by using the object's motion vector. Block motion compensation simply partitions a picture into blocks and treats each block as an object and then finds its motion vector which locates the most-similar block in a prior picture (motion estimation). This simple assumption works out in a satisfactory fashion in most cases in practice, and thus block motion compensation has become the most widely used technique for temporal redundancy removal in video coding standards. Further, periodically pictures coded without motion compensation are inserted to avoid error propagation; blocks encoded without motion compensation are called intra-coded, and blocks encoded with motion compensation are called inter-coded.

Block motion compensation methods typically decompose a picture into macroblocks where each macroblock contains four 8×8 luminance (Y) blocks plus two 8×8 chrominance (Cb and Cr or U and V) blocks, although other block sizes, such as 4×4, are also used in H.264/AVC. The residual (prediction error) block can then be encoded (i.e., block transformation, transform coefficient quantization, entropy encoding). The transform of a block converts the pixel values of a block from the spatial domain into a frequency domain for quantization; this takes advantage of decorrelation and energy compaction of transforms such as the two-dimensional discrete cosine transform (DCT) or an integer transform approximating a DCT. For example, in MPEG and H.263, 8×8 blocks of DCT-coefficients are quantized, scanned into a one-dimensional sequence, and coded by using variable length coding (VLC). H.264/AVC uses an integer approximation to a 4×4 DCT for each of sixteen 4×4 Y blocks and eight 4×4 chrominance blocks per macroblock. Thus an inter-coded block is encoded as motion vector(s) plus quantized transformed residual block.

Similarly, intra-coded pictures may still have spatial prediction for blocks by extrapolation from already encoded portions of the picture. Typically, pictures are encoded in raster scan order of blocks, so pixels of blocks above and to the left of a current block can be used for prediction. Again, transformation of the prediction errors for a block can remove spatial correlations and enhance coding efficiency.

When a video bitstream is transmitted over a channel, parts of the data may be corrupted or lost. When the video is decoded, it is necessary to use a concealment method to replace the macroblocks that were lost or corrupted. A very simple concealment method may copy macroblocks from the previous frame, or substitute blank macroblocks for the first frame.

Spatial concealment uses pixels from the current frame to fill in the missing data, while temporal concealment uses the previous frame to predict the current frame. Spatial concealment should be used for scene changes, but this requires scene change detection. Any poorly concealed macroblocks will propagate over multiple frames, because video compression is achieved by predicting the current frame from past frames.

A simple concealment algorithm applies spatial concealment to INTRA-coded frames or INTRA-coded macroblocks, and applies temporal concealment to INTER-coded frames and macroblocks. However, this does not produce acceptable results, unless INTRA mode is used only for scene changes or new objects in the scene, and if INTER mode is never used in those cases. Encoders may not have sophisticated mode decision or scene detection logic. Periodic INTRA-coded frames may be inserted for random access points. Also, standards such as H.263 and MPEG-4 have a mandatory INTRA refresh rate for macroblocks, to limit potential drift caused by different IDCT implementations. In addition, encoders may use additional adaptive INTRA refresh to aid recovery, in case the bitstream is corrupted. The coding mode alone does not provide enough information to determine the most appropriate concealment method.

For videophone or camcorder applications, scene changes may be uncommon; therefore, earlier concealment methods only applied spatial concealment to the first frame, and temporal concealment to all remaining frames. However, this is not adequate for wireless streaming, which may contain frequent scene changes.

Also, because spatial concealment was so rarely applied, the method was quite simple. If the macroblocks above and below were available, a weighted average was used to fill in the missing pixels. Otherwise, a gray block was substituted, partly motivated by the fact that early cameras for handsets produced mostly dull colors.

Temporal concealment was also fairly simple, relying on the usual MPEG-4 motion-vector prediction to estimate the displacement from the previous frame. However, if much of the frame is missing, the predictors are unavailable, leading to a zero motion vector. This may be sufficient for talking head content, but can lead to frame break-up if there is much motion or panning.

FIG. 4 illustrates a prior concealment method. However, for content with scene changes and more motion, an improved concealment method is required.

SUMMARY OF THE INVENTION

The present invention provides error concealment methods for video with a scene change detection based on inter-coded macroblock energy and/or temporal concealment with predicted motion vectors as the global motion vector of the prior frame when half of the current frame macroblocks are corrupted and/or temporal concealment motion vector prediction as the median of collocated prior frame macroblock motion vector together with prior slice motion vectors.

DESCRIPTION OF THE PREFERRED EMBODIMENTS

1. Overview

Figure 1A:
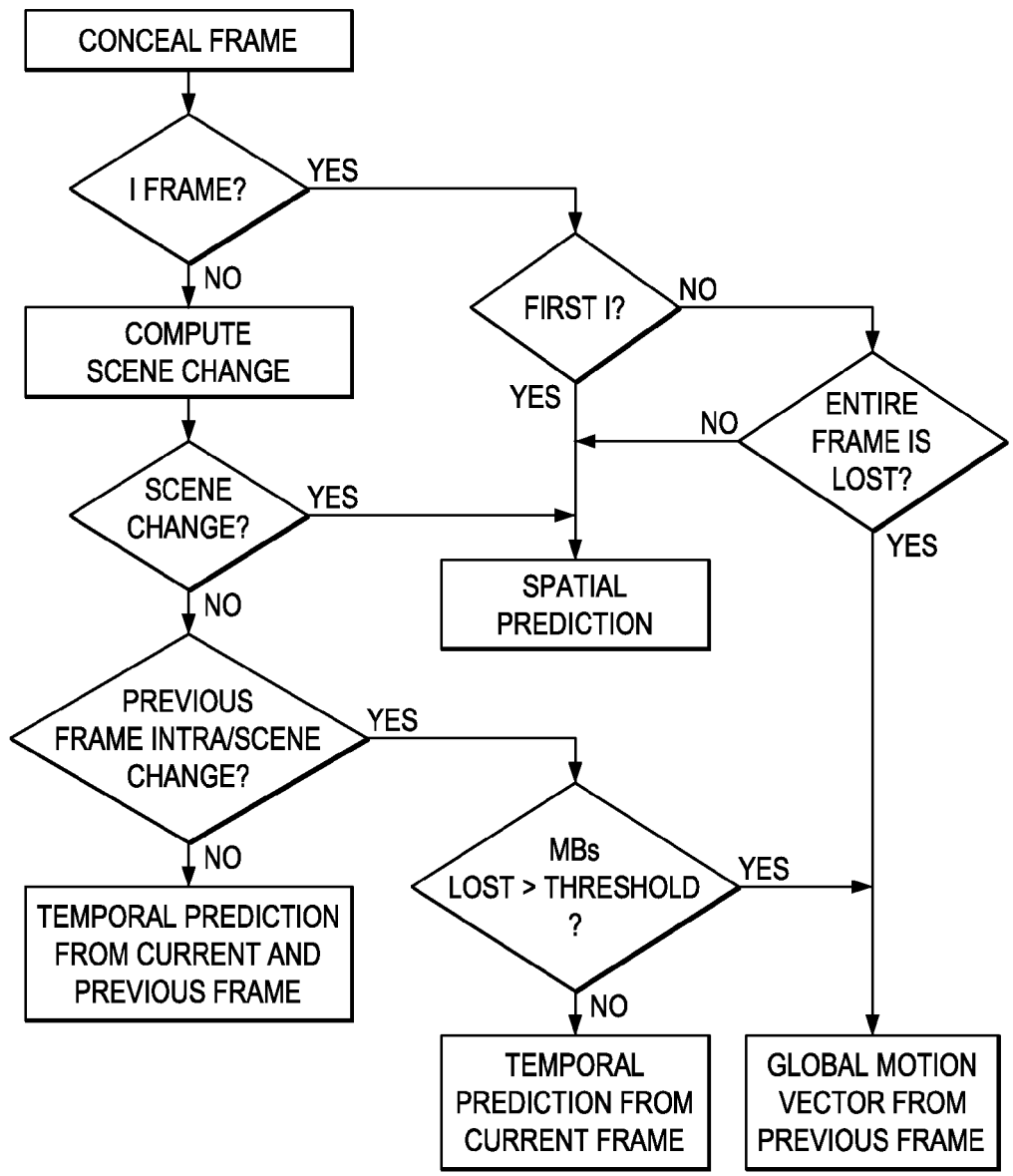
FIGS. 1A-1B show a preferred embodiment error concealment and details of interpolation.

Preferred embodiment video error concealment methods provide a scene change detection based on inter-coded macroblock energy and temporal concealment with predicted motion vectors as the global motion vector of the prior frame when at least half (or other significant fraction) of the current frame macroblocks are corrupted. Also, temporal concealment motion vector prediction as the median of collocated prior frame macroblock motion vector together with prior slice motion vectors. FIG. 1A shows components of the first preferred embodiment methods which would be part of decoder post-processing.

Figure 3B:
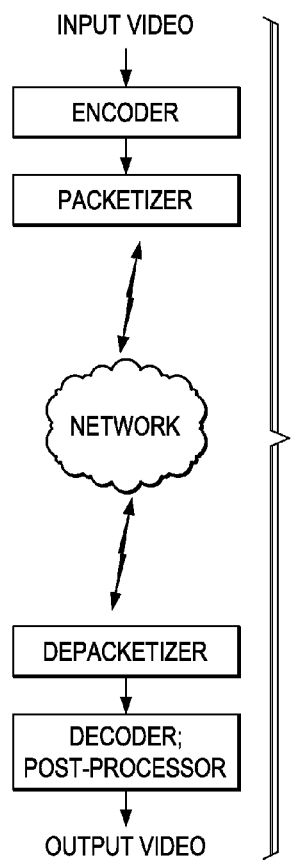
FIGS. 3A-3B are a processor and network communication.
Figure 3A:
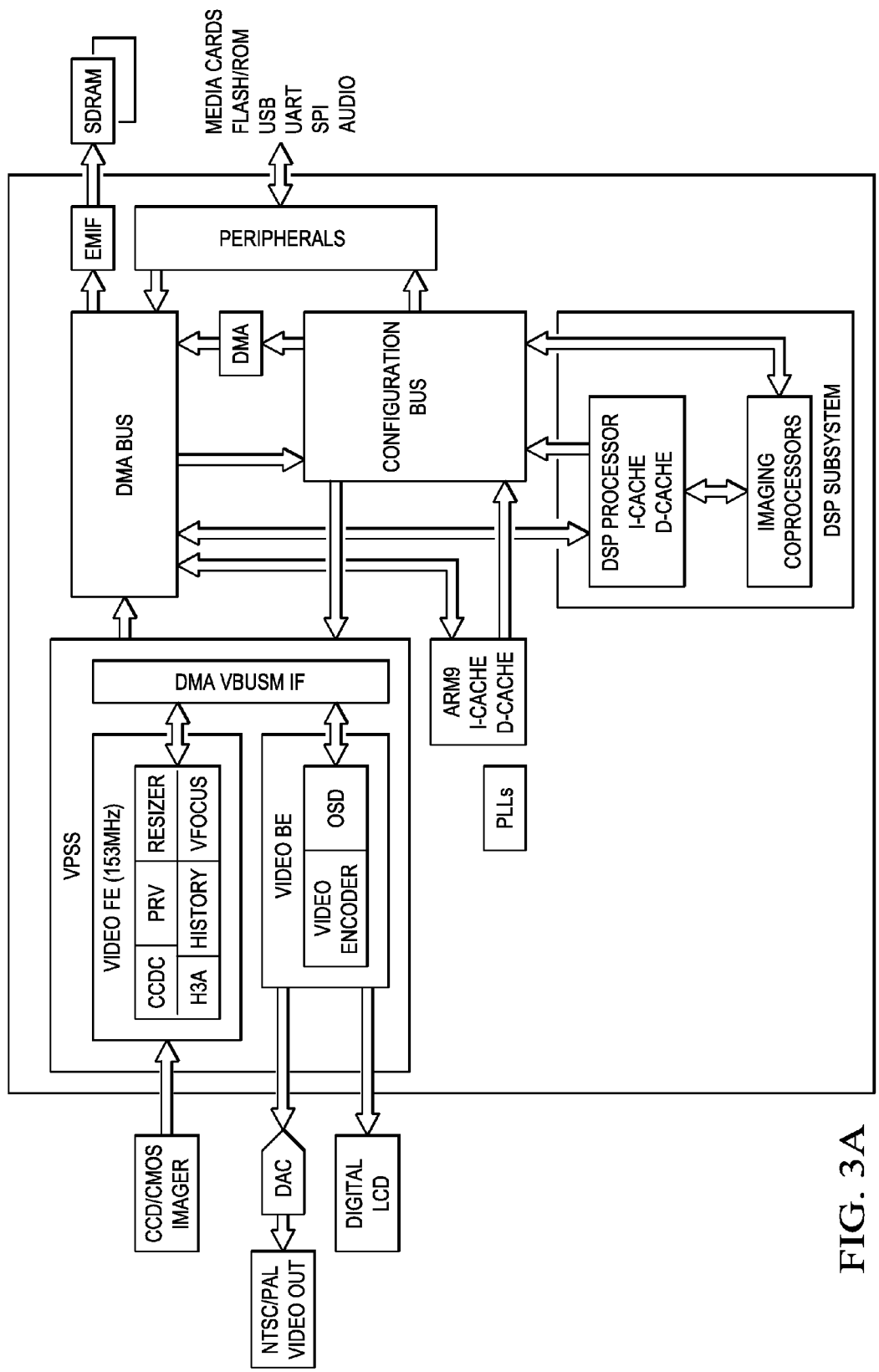
Figure 5A:
FIGS. 5A-5B, 6A-6B, 7A-7B, 8A-8B, 9A-9B, 10A-10B, and 11A-11B are experimental results.
Figure 5B:
Figure 6A:
Figure 6B:
Figure 7A:
Figure 7B:
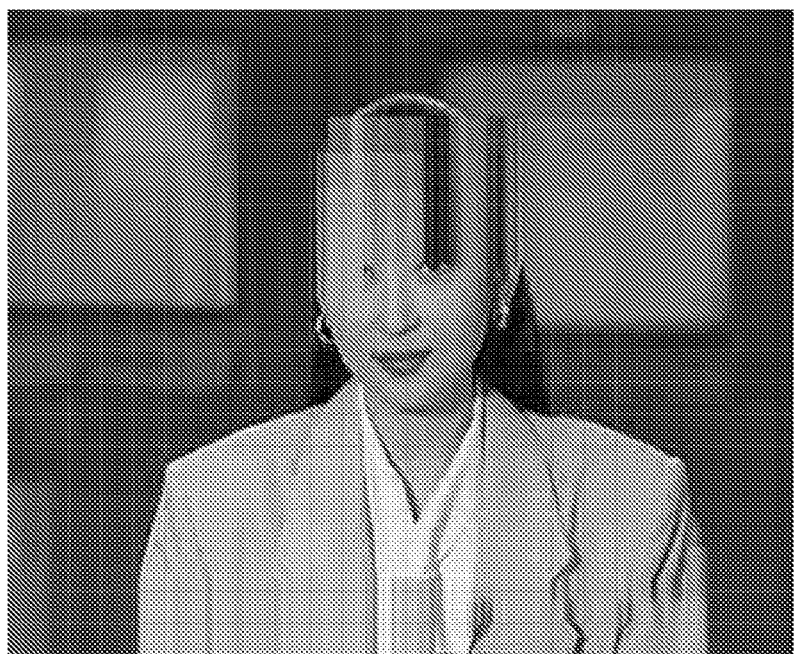
Figure 8A:
Figure 8B:
Figure 9A:
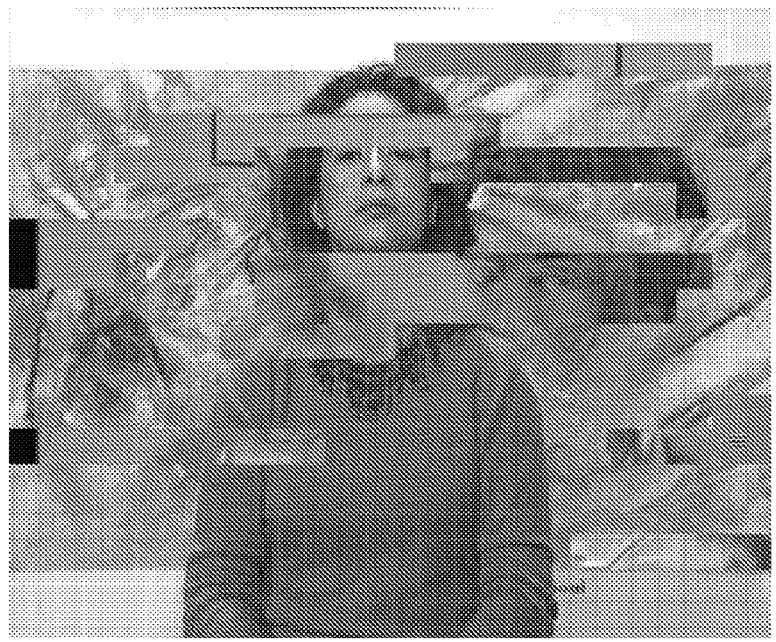
Figure 9B:
Figure 10A:
Figure 10B:

Preferred embodiment systems (e.g., camera cellphones, PDAs, digital cameras, notebook computers, etc.) perform preferred embodiment methods with any of several types of hardware, such as digital signal processors (DSPs), general purpose programmable processors, application specific circuits, or systems on a chip (SoC) such as multicore processor arrays or combinations such as a DSP and a RISC processor together with various specialized programmable accelerators (e.g., FIG. 3A). A stored program in an onboard or external (flash EEP) ROM or FRAM could implement the signal processing methods. Analog-to-digital and digital-to-analog converters can provide coupling to the analog world; modulators and demodulators (plus antennas for air interfaces such as for video on cellphones) can provide coupling for transmission waveforms; and packetizers can provide formats for transmission over networks such as the Internet as illustrated in FIG. 3B.

2. Error Concealment Preferred Embodiments

Figure 4:
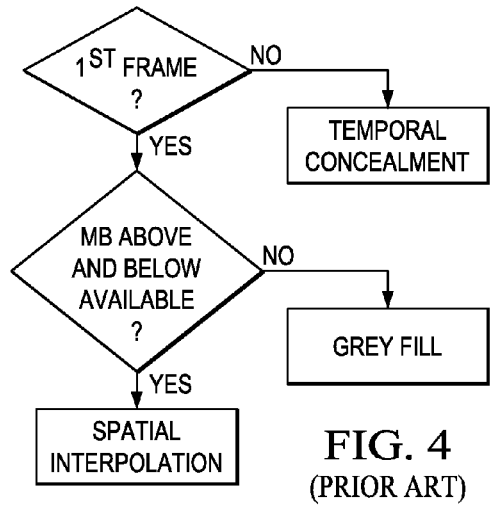
FIG. 4 shows a known concealment method.

FIG. 1A illustrates a first preferred embodiment concealment method for digital video decoding and can be compared to the prior method of FIG. 4. The decoding could be of H.264/AVC encoded video. The various blocks of FIG. 1A are discussed in the following sections.

3. Motion Vector Prediction

In the past, temporal concealment was done using the motion vector information from the current frame only. The lost motion vector (MV) for a current macroblock (MB) was predicted using the median of the MVs of the left, top and top right neighboring MBs of the current MB in the current frame. Because of the variable-length decoding (VLD) nature of the encoded video, when MBs are lost or corrupted, we lose all the subsequent MBs in that slice and are able to get the next good MB only in the next slice or the next frame. Therefore, the prediction of a lost MV as per the earlier methods for most of the time was using only a predicted MV for the left MB, rather than an actual MV of the left MB. As the motion of the current frame is correlated with motion of the previous frame, the preferred embodiment methods predict the motion of the corrupted MB using the median of the MV of the collocated MB from the previous frame plus the MVs of the top and top right neighbor MBs from the current frame.

If the previous frame was an Intra frame (so no MVs), or was detected as a scene change, then we predict the MV of the corrupted MB using the information from the current frame only. In this case, as in the temporal concealment case, prediction is improved by taking the median of more motion vectors. We now take the median of the MVs of the top, top right, next available bottom, and bottom right neighboring MBs of the current frame. To compute a median of 4 MVs, the maximum and minimum values are discarded, and the middle two values are averaged. In case any of the neighbors are not available, we use 0 motion vector for that neighbor while computing the median. Other variations are possible; for instance, using MVs of the top left or next available bottom left neighboring MBs. The following table compares the preferred embodiment methods with the prior methods for temporal prediction.

| BEFORE | NOW |
| --- | --- |
| Compute median MV of Top, Top Right and Left neighbor. Left neighbor is most of the time not available, so effectively, predict from the Top and Top right MV. | If the previous frame is not an intra frame or not detected as scene change, compute median MV of collocated neighbor from previous frame and Top and Top right neighbor from the current frame. Else, compute median MV of Top, Top right, nearest available (Bottom and Bottom right) neighbor. If any of the neighbor is not available, use (0, 0) MV for that neighbor in the median computation. |

Another variation for MV prediction is more sophisticated compared to the above prediction approach.

| BEFORE | NOW |
| --- | --- |
| Compute median MV of Top, Top Right and Left neighbor. Left neighbor is most of the time not available, so effectively, predict from the Top and Top right MV. | If previous frame is not detected as scene change or I frame type, compute median MV of Top, Top right, and collocated MB in previous frame neighbors. If top or top right neighbor is not available, use GMV (global motion) of previous frame for that neighbor in the median computation. If previous frame is a scene change or I frame type, then- Compute median MV of Top, Top right, nearest available Bottom and Bottom right neighbor. If any of the neighbor is not available, use (0, 0) MV for that neighbor in the median computation. If current frame is I frame or entire frame |

| BEFORE | NOW |
|---|---|
| | lost, use global MV of previous frame |

Another variation is possible for H.264/AVC when multiple reference frames are allowed and each MV is associated with a reference frame index (ref_idx). In that case, it is necessary to predict or assume a reference frame index as well, especially if the predictor MVs are not associated with the same reference frame. For instance, if the top and next available bottom MV do not have the same reference frame index, the top ref_idx may be chosen. Then only predictor MVs with the chosen ref_idx are used to compute a median. Similarly, additional predictors (top left, bottom left) may be considered to find up to three predictor MVs that have the chosen ref_idx.

4. Global Motion Estimation

If a large part of a frame is lost, most neighboring MBs are unavailable, and the MV estimate often is (0,0). In this case, the temporal concealment is effectively a block copy from the previous frame. To improve performance for panning sequences, it is better to estimate global motion from the previous frame.

There is some complexity associated with computing the global motion vector. For every frame, two separate histograms, for MVx (x-component of MV vector) and MVy (y-component) for all MBs, are maintained. The peak value of each histogram is used to form the estimate of global motion. This may be computed for each frame, and saved as part of the concealment state information, in case it is needed in the next frame. Alternatively, the decoder may always maintain the MVs for both the current and previous frame, using a ping-pong buffering mechanism.

If more than a large threshold number (e.g., half) of the MBs of the frame are corrupted in contiguous MBs, there is less motion information available from the current frame, so the preferred embodiment method effectively predicts the missing MVs based on the previous frame's MVs. Global motion should not be used to conceal all frames, but only those frames having a substantial portion of the frame corrupted. Note that once the global MV is estimated, the same motion vector is used to conceal all of the contiguous macroblocks; that is, the global motion is taken as the MV for each corrupted MB.

5. Spatial Concealment

A simple spatial concealment only vertically interpolates pixels when the macroblocks above and below a lost macroblock are available. In particular, if a is the boundary pixel value from the macroblock above, and b is the boundary pixel value from the macroblock below, the 16 missing pixel values in a column between these boundary pixels are computed using a weighted average. For a pixel value p on the nth row of the missing MB, the weighted average is:

$$p = (a\,n + b(16-n))/16.$$

The divide by 16 can be implemented with a shift to avoid cycles for a division. Although a similar procedure could be followed for two missing rows of macroblocks, we cannot avoid the division if the number of concealed MB rows is not a power of 2.

Substituting a gray block is simple, and edges show up nicely in subsequent frames, but quality can be improved by matching the edge pixels better. A simple averaging scheme can be generalized to any number of missing macroblocks, while blending better with surround MBs.

The preferred embodiment spatial concealment works for any number of missing MB rows. If a is the nearest pixel above, and b is the nearest pixel below, for any pixel p, in that column of the missing macroblock, compute:

$$p = (a+b)/2.$$

Note that once a macroblock is concealed, its pixel values are used to compute the averages for missing macroblocks below it. For instance, in the same column of the MB below, the missing pixels have value p', which is an average of p and b, and for the MB below that, the missing pixels have value p", etc.:

$$p' = (p+b)/2.$$
$$= a/4 + 3b/4$$
$$p'' = (p'+b)/2.$$
$$= a/8 + 7b/8.$$

This can be implemented with low complexity, and blends better than the gray blocks.

For MB rows missing at the top or bottom of the frame, simply replicate the nearest available pixel vertically. The following table summarizes the preferred embodiment methods compared to the simple spatial concealment method.

| CONDITION | BEFORE | NOW |
|---|---|---|
| At most one row of MBs lost | Do weighted prediction | Do weighted prediction |
| More than one row of MBs lost | Fill lost MBs with grey color | Average the available error free top and the bottom neighbor pixel |
| Any of the top or bottom neighbor is not available (i.e., near edge of the frame) | Fill with grey color | Repeat the immediate neighbor |

Figure 1B:
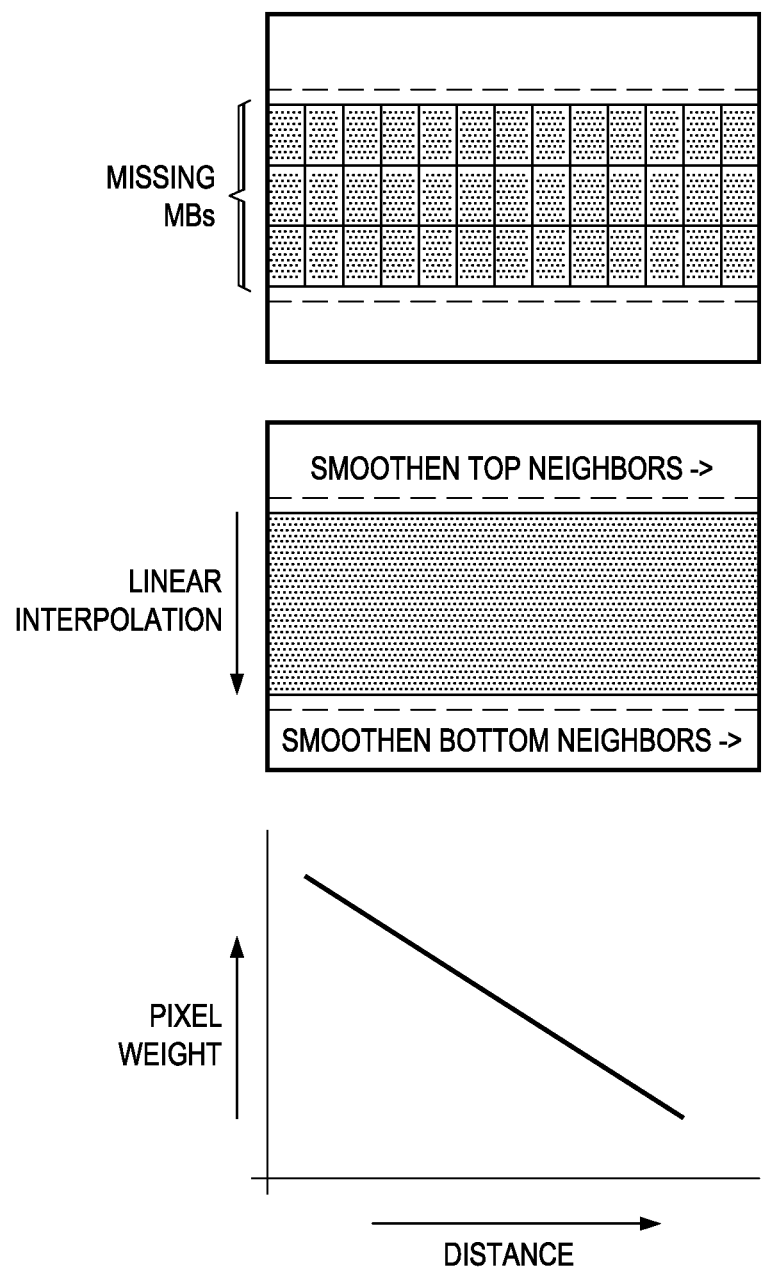
Figure 2A:
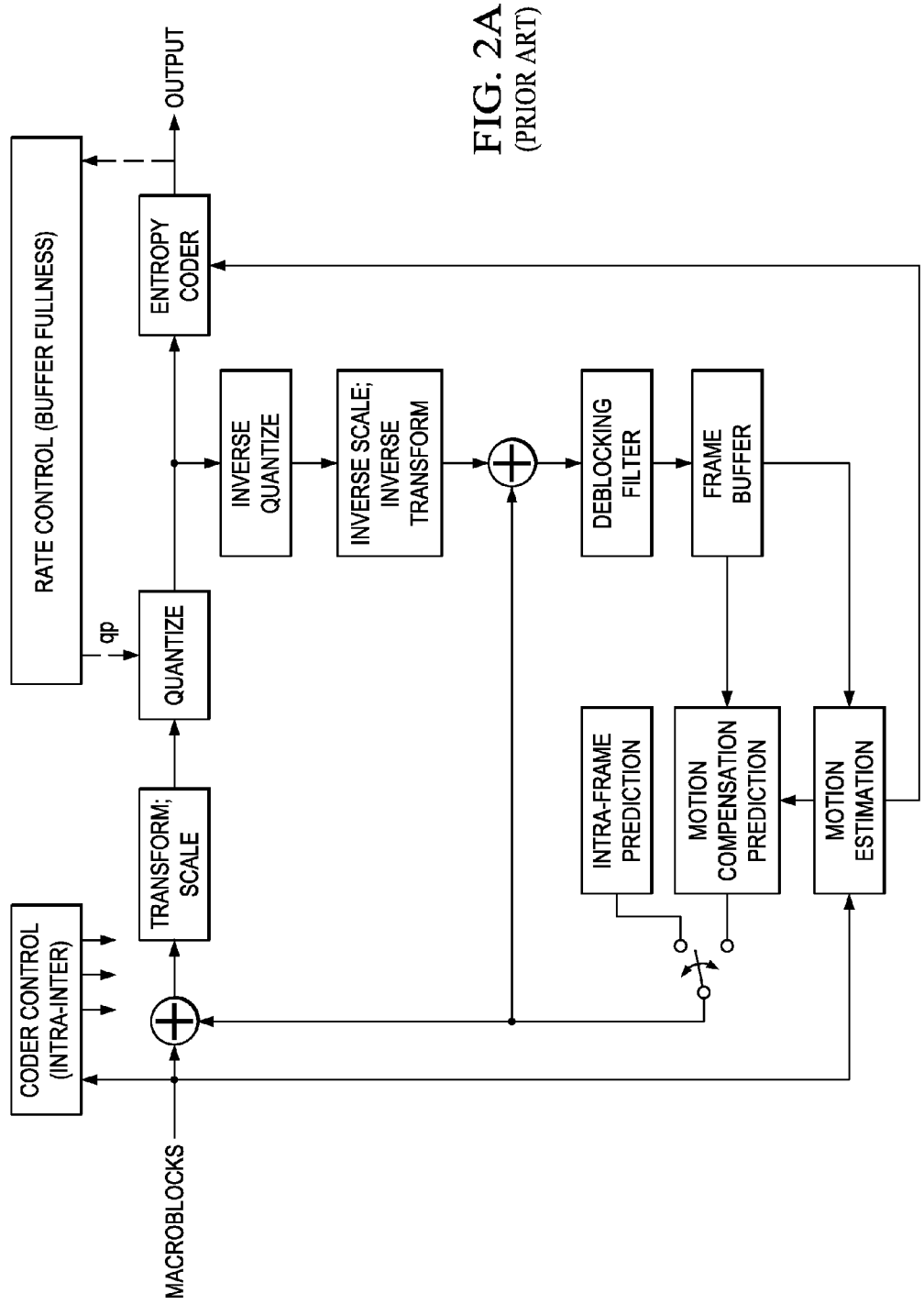
FIGS. 2A-2B illustrate H.264/AVC video coding.
Figure 2B:
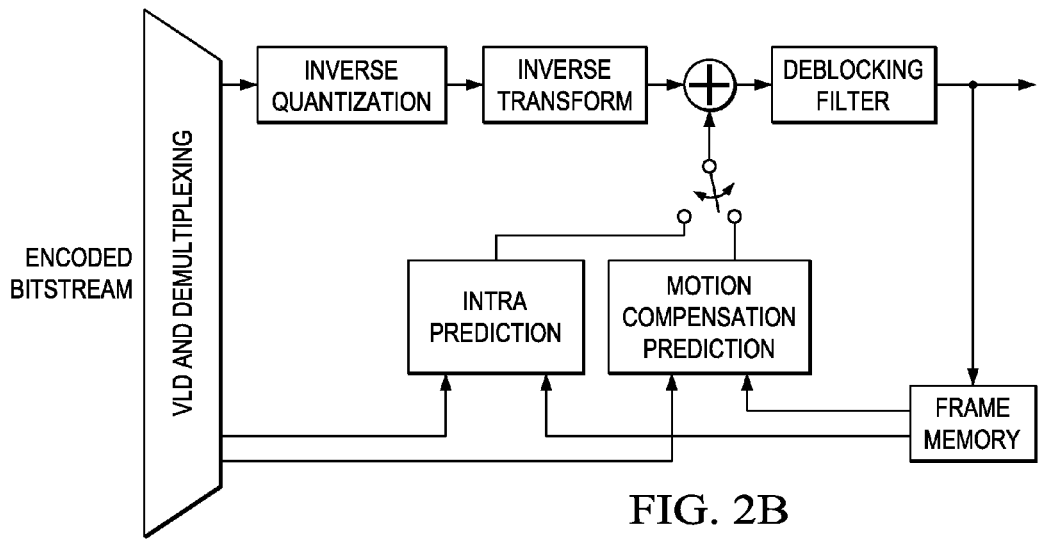
Figure 11A:
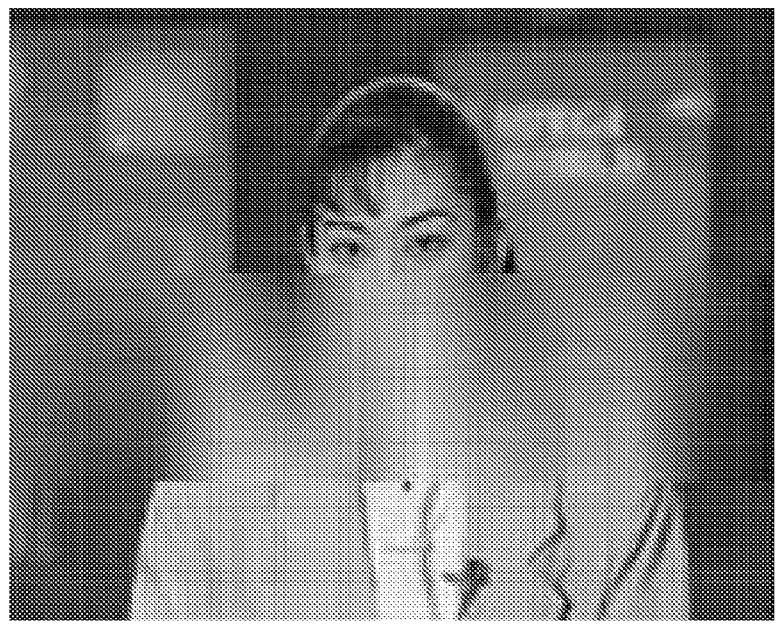
Figure 11B:

Another variation implemented to improve the spatial concealment quality when more then 1 row of MBs are missing computes the distance between the top and bottom available error-free neighbors and rounds it to a factor of two so as to avoid the division operator by use of the shift operator. We prepare the top and bottom 16 neighbors by smoothing them in the horizontal direction as shown in FIG. 1B. This is done to reduce the effect of vertical edges. After preparing the smoothed top and bottom neighbors, we conceal the lost pixels by replacing them with the linear interpolated values using the top and bottom smoothed neighbors. Top and bottom neighbors are assigned weights based on the distance from the pixel to be concealed. FIGS. 11A-11B show the improvement in picture quality when interpolation weight is assigned based on distance from top and bottom available neighbors (FIG. 11B) compared to always assuming the distance to be 16 pixels apart (FIG. 11A).

Spatial concealment should be applied to scene changes. Even without detection of scene changes in I-frames, preferred embodiment methods apply spatial concealment when both top and bottom MB neighbors are available, i.e., only one row of contiguous MBs (or less) is missing at a time.

6. Scene Change Detection for P-Frames

Scene change detection is required to effectively apply spatial concealment beyond the first frame, yet a scene change cannot be determined by the coding mode of the frame or macroblocks. If spatial concealment is performed for periodic I-frames, for example, quality may degrade significantly. Conversely, if temporal concealment is performed for a scene change, the result is a mix of two scenes that propagates until the next error-free I-frame.

A metric for MB energy in P-frames can be used to determine how dissimilar consecutive frames are. The preferred embodiment methods compute the average MB energy, using the error-free inter-coded MBs only. By summing the absolute value of the IDCT residuals for error-free inter-coded MBs, we have a metric similar to a SAD (sum of absolute differences). Note that this metric is robust to variations in the bit rate or quantization parameter. Because spatial concealment may also be appropriate for sequences with high motion, we use the term scene change to denote low correlation with the previous frame. If the average MB energy is greater than a threshold, a scene change is detected. Note that we do not consider intra-coded MBs for the average energy computation as we have a fixed value threshold and different encoders may insert different numbers of intra refresh MBs which may lead to false scene change detection. For example, a scene change threshold value for 8-bit (0-255) luminance data could be about 5000 (=256×20). That is, if the average pixel value in the error-free inter-coded MBs is 20 or greater, then a scene change for the frame is detected.

This method improves quality significantly. By detecting scene changes, it is possible to make the right decision, choosing between temporal and spatial concealment. This significantly helps in removing the color bleeding from the previous scene until the next error-free I-frame. The metric can be computed concurrently with other processing on processors such as the C6xxx from Texas Instruments, and does not add to the number of cycles.

7. Experimental Results

The combined impact of these preferred embodiment concealment improvements may be as high as 2 dB PSNR. The impact is less for sequences with no scene changes or no panning, but it significantly improves quality for more complex sequences. The individual aspects are as follows.

Motion Vector Prediction

Improved temporal prediction gives up to 1 dB improvement in PSNR. The improvement is most visible for VGA (640×480 pixels) format.

Global Motion Estimation

For panning sequences, global motion estimation can improve the quality as much as 0.6-0.7 dB.

Spatial Concealment

Improvements in spatial concealment propagate through all frames until the next scene change. FIGS. 5A-5B, 6A-6B, 7A-7B contrast (A) the original spatial concealment with (B) the preferred embodiment concealment. The preferred embodiment concealment is especially effective at higher resolutions, e.g., VGA (640×480 pixels), but improves quality and reduces color bleeding into subsequent frames for all resolutions.

Scene Change Detection for P-Frames

The improvement for scene change detection is illustrated in FIGS. 8A-8B, 9A-9B with (A) the prior temporal concealment compared to (B) preferred embodiment concealment. While temporal concealment would produce a mixture of two or more scenes, spatial concealment removes the previous scene, producing better quality.

FIGS. 10A-10B and 11A-11B show spatial concealment applied on scene change where the spatial concealment used is the variation with top and bottom neighbors smoothed and then interpolated based on the distance from lost pixel.

8. Implementation

The logical flow for the preferred embodiment concealment is outlined in the following pseudocode.

```
Initialize frame size, buffer pointers, etc.
Get pointers to decoder data buffers
    Call callbacks
    Group contiguous MBs with same concealment type
    Get frame energy and detect scene change (P VOPs)
    Based on error slice type, initialize function pointers
    Loop over error slices, perform concealment
```

A concealment library has been implemented in such a way that it can be reused by codecs other than MPEG-4 codecs, on various platforms. This reduces development and integration time, and ensures consistent quality among video decoders. Features of the implementation are summarized in the following pseudocode.

```
Separate independent library
Can integrate in any decoder code base and can be reused by codecs other
than MPEG-4
Easy to port on any platform
Clean APIs and call back defined
Has its own scratch, persistent memory and DMA resources
Decoder creates the handle to the concealment once in the beginning
No restrictions on the data storage technique imposed on decoders
Modular Code
Concealment algorithm separated from the data I/O details
Build time configurable program concurrency depth
    Currently N MB design
    Programmable concurrency, easy to change schedule
    Easy to make N MBs to 1 MB
```

Generic API

A generic API for error concealment reduces development and integration time, and allows a common library to be used in all video codecs, to ensure consistent quality among video decoders. There is also an effort within OpenMAX to define generic APIs for media libraries; APIs for error concealment are planned for version 2, and are not yet specified.

The following lists four generic APIs.

```
int ERRCONCL_TI_errConclnumAlloc(void);
int ERRCONCL_TI_errConclAlloc(void *memTab);
void   ERRCONCL_TI_initErrConcealObj(ErrConcl_Handle
handleErrConcl,   void *memTab, errConclStruct *pErrConclParams);
void ERRCONCL_TI_errorConceal(ErrConcl_Handle
handleErrConcl,   errConclStruct *pConclInArgs);
```

Accessing Decoder Data

Because the preferred embodiment concealment is performed as postprocessing, each decoder must store any relevant data to memory, such as MB_status or motion vectors. To make the concealment generic for any decoder, callback routines are used to access the data. In this way, the decoder is not constrained to a particular data structure or the amount of data. For instance, an MPEG-4 decoder may store up to 4 motion vectors, while and H.264 decoder may store up to 16 motion vectors per macroblock. Each decoder provides a routine to access the data. The callback routines implemented are summarized in the following pseudocode.

```
void ERRCONCL_TI_getMbStatus(int *pInfoBufPtr, int *pInfoBufPitch,
unsigned short xpos,unsigned short ypos, char nMb, char *pMbStat);
void ERRCONCL_TI_getMbMode(int *pInfoBufPtr, int *pInfoBufPitch,
unsigned short xpos, unsigned short ypos, char nMb, char *pMbMode);
void ERRCONCL_TI_getMb4Mv(int *pInfoBufPtr, int *pInfoBufPitch,
unsigned short xpos, unsigned short ypos, char nMb, short *pMv);
void ERRCONCL_TI_getMbMv(int *pInfoBufPtr, int *pInfoBufPitch,
unsigned short xpos, unsigned short ypos, char nMb, short *pMv);
void ERRCONCL_TI_setMbMv(int *pInfoBufPtr, int *pInfoBufPitch,
unsigned short xpos, unsigned short ypos, char nMb, short *pMv);
void ERRCONCL_TI_initConclInfoBufs(int *pInfoBufPtr,
    int *pInfoBufPitch, errConclStruct *pErrConclParams);
void ERRCONCL_TI_getFrmEnergy(int *pInfoBufPtr,
    int *pInfoBufPitch, unsigned short xpos, unsigned short ypos,
    int nMb, int *pFrameEnergy)
```

Other callback routines are possible. For instance, with MPEG-4 data partitioning, there might be a callback routine getDCvalues( ). Then if the second partition of an I-frame is corrupted, DC values from the first partition can be used for spatial concealment, if desired. The preferred embodiment spatial concealment does not use the DC values, because the resulting 8×8 colored blocks may not blend well with the scene for low-resolution video, e.g., QCIF. However, at higher resolutions, the DC values might be used more effectively in further preferred embodiments.

Other callback routines may be added for H.264 as well. For instance, H.264 supports supplemental enhancement information (SEI) messages, which may be used by the encoder to signal a scene change. A callback of getSceneChangeFlag( ) might return TRUE, FALSE, or UNAVAILABLE. Also, getMbMode( ) might indicate how many motion vectors are present, and may give useful edge information as well. Possibly, getRefIdx( ) may be useful, if multiple reference frames are accessed by the decoder.

Note that a memory-constrained decoder need not store all of the data. For instance, if motion vectors are not stored, the getMbMv( ) callback may simply return (0,0). This may be useful for decoding high-resolution video.

The concealment library loads the decoder data into a generic data structure, shown in the following pseudocode. For example, INFO_SIZE indicates the number of different structures that the decoder has available in memory for concealment. INFO_SIZE=3 might be used if only mb_type, MV, and MBenergy is saved.

```
#define MB_STATUS_OK       0
#define ERR_I              1
#define ERR_P              2
#define ERR_I_DP           3
#define ERR_P_DP           4
#define INFO_SIZE          10
#define NUM_REF_FRMS       2
typedef struct errorInfoStruct {
    unsigned short errPos;
    unsigned short errLen;
}errInfoStruct;
typedef struct errorConcealStruct
{
    char           chromaFormat;
    char           mvResolution;
    unsigned short frameWidthY;
```

```
-continued unsigned short frameWidthUV;
    unsigned short dispWidth;
    unsigned short mbWidth;
    unsigned short mbHeight;
    int            pInfoBufPtr[INFO_SIZE];
    int            pInfoBufPitch[INFO_SIZE];
    unsigned char  *pCurFrame[3];
    unsigned char  *pRefFrame[NUM_REF_FRMS][3];
    unsigned char  *pDispFrame[3];
    errInfoStruct  *pErrInfo;
    int            numErrors;
}errConclStruct;
typedef void *ErrConcl_Handle;
```

Programmable Concurrency

For implementation on a processor such as a C6xxx from Texas Instruments, N-MB processing is useful to schedule concurrent operations. On other platforms, a different schedule may be desired, due to coprocessors, different DMA characteristics, etc.

```
ERRCONCL_TI_conceal(errConclObj *pErrConclObj, unsigned short
    xpos, unsigned short ypos, unsigned short errLen)
{
    for(i = 0; i < (int) (errLen + CONCURRENT_DEPTH − 1);){
        nmb = N_MB;
        ...
        CONCURRENT_START(pConclVarsPtr, pConclVars,
            CONCURRENT_DEPTH);
        pfEstimateMv(pErrConclObj, xEpos, yEpos, 0);
        pfDmaXfrIn(pErrConclObj, 0);   // ping
        pfConclAlg(pErrConclObj, 1);   // pong
        pfDmaXfrOut(pErrConclObj, 2); // pang
        /* Implemented the ping pong buffering mechanism by
rotating the structure pointers */
        CONCURRENT_END(pConclVarsPtr, pConclVars,
            CONCURRENT_DEPTH);
        ...
}
```

Scalable Complexity

Because there is a tradeoff between concealment quality and computational expense, the concealment library needs to support scalable complexity. For instance, a higher complexity routine might be used for applications using QCIF (176×144 pixels) video under harsh error conditions, while a less complex routine might be used for applications using VGA (640×480 pixels), with mild or infrequent error conditions.

To provide the scalability, a generic concealment is called with function pointers. By setting the function pointers, the complexity of the concealment is programmable. Either the application may dictate the complexity, or the decoder may make the decision based on format, bit rate, or channel information from the application.

9. Modifications

The preferred embodiments may be modified in various ways. For example, further concealment improvements may include:
Scene change detection for Intra frames.
Scene change detection for P frames with an adaptive threshold for different content or codecs.
H.264/AVC Intra frames spatial concealment algorithm, using intra prediction modes.
Concealing an erroneous frame from the future reference frame (B VOPS) or multiple reference frames (H.264/AVC).

Spatial interpolation and MV prediction using all the four neighbors (TOP, BOTTOM, RIGHT, LEFT) for H.264 streams with FMO feature.

Scene change detection is particularly important for some applications, such as streaming video. It is likely that streaming video will begin each scene change with an I-frame, but will have periodic I-frames as well.

What is claimed is:

1. A method of video decoding error concealment, comprising the steps of:
    (a) detecting scene change for a current frame of a sequence of video frames, said detecting using an inter-coded macroblock energy measure, wherein when said detecting detects said current frame as not a scene change, applying temporal error concealment with motion vector predicted from a global motion of immediately-prior intra-coded frame when at least a fraction of macroblocks of said current frame are corrupted or lost, wherein a global motion vector of a prior frame is utilized as the motion vector of said current frame when at least a portion of said current frame is corrupted, wherein when said detecting detects said current frame as not a scene change, applying temporal error concealment with motion vector predicted from immediately-prior inter-coded frame collocated macroblock motion vector together with current frame prior macroblock motion vectors; and
    (b) applying spatial error concealment for said current frame when said detecting detects said current frame as a scene change.

2. The method of claim 1, wherein said fraction equals one half.

3. A method of video decoding error concealment, comprising the steps of:
    (a) for an inter-coded current frame of a sequence of video frames, detecting scene change using an inter-coded macroblock energy measure, wherein when said detecting detects said inter-coded current frame as not a scene change, applying temporal error concealment with motion vector predicted from immediately-prior inter-coded frame collocated macroblock motion vector together with inter-coded current frame prior slice macroblock motion vectors;
    (b) applying spatial error concealment for said inter-coded current frame when said detecting detects said inter-coded current frame as a scene change;
    (c) for an intra-coded current frame, applying temporal error concealment with motion vector predicted from a global motion of immediately-prior frame when said intra-coded current frame is corrupted or lost, wherein a global motion vector of a prior frame is utilized as the motion vector of said intra-coded current frame when at least a portion of said intra-coded current frame is corrupted.

4. The method of claim 3, wherein when a current frame is intra-coded, applying spatial concealment when said inter-coded current frame is corrupted or lost.

* * * * *